United States Patent [19]

Conroy

[11] Patent Number: 4,466,798
[45] Date of Patent: Aug. 21, 1984

[54] PRINTED COMPUTER TRAINING DEVICE

[75] Inventor: James R. Conroy, Fairfield, Conn.

[73] Assignee: Champion International Corporation, Stamford, Conn.

[21] Appl. No.: 396,816

[22] Filed: Jul. 9, 1982

[51] Int. Cl.³ .............................................. G09B 19/00
[52] U.S. Cl. ..................................... 434/118; 434/227
[58] Field of Search ....................... 434/118, 227, 219; 206/328

[56] References Cited

U.S. PATENT DOCUMENTS 1,527,100 2/1925 Williams ............................. 434/227
2,802,284 8/1957 Dreisonstok et al. ............... 434/227
3,161,967 12/1964 Siegel et al. ......................... 434/227

Primary Examiner—William H. Grieb
Attorney, Agent, or Firm—Evelyn M. Sommer; John H. Mulholland

[57] ABSTRACT

A printed computer training device having a number of leaves hingedly connected together. A plurality of first leaves have screen display simulating indicia on a first side and keyboard action simulating indicia on a second side. A second leaf, hinged to the first leaf, has keyboard simulation indicia on a first side. A plurality of third leaves, hinged to the second leaf, have operating instruction indicia on a first side and keyboard action simulating indicia on a second side.

8 Claims, 7 Drawing Figures

FIG-4

Screen Display

Sequence 2

```
JOB MENU    SCREEN MENUS S  STEP     KEY EN DEV C3 07:53:45 08/05/81 CUR

SALES ORDER PROCESSING
              ----------------------

S  -  SALES DESK INQUIRY

E  -  SALES ORDER ENTRY

C  -  CREDIT MEMO ENTRY

I  -  INQUIRY / CORRECTION MODE / CANCEL

O  -  OPEN ORDER INQUIRY (CUST$, REF$, CTRL$)

R  -  SHIPPING ORDER REPRINTS

B  -  BACKORDERS ALLOCATION

H  -  HOLD STOCK FOR CUSTOMER

CR -  CREDIT HOLD RELEASE
```

Keyboard Action

Sequence 2

Operating Instruction

Introduction — The purpose of this manual is to familiarize you with the operation of a Video Display Terminal (CRT) through simulated performance of selected Nationwide Order Processing System (NOPS) Functions.

The Manual will simulate these operations:
1. Inquiry about an item balance
2. Inquiry about a customer
3. Entry of an order
4. Inquiry about a customer's open order When the arrow points up, turn the top page down to simulate the changing of a screen.
↑

When the arrow points down, turn the bottom page up.
↓

The Nationwide Main Menu is the starting point to gain access to any program in the system.

Start — To display the Main Menu, depress PF key.

Sequence 1 — To access Sales Order Processing, key letter S.
Then depress Enter.

Sales Order Processing Menu screen will appear.

Sequence 2 — To make a Sales Service Inquiry, key letter S.
Then depress Enter.

Item/Customer File Inquiry screen will appear.

PRINTED COMPUTER TRAINING DEVICE

BACKGROUND OF THE INVENTION

This invention relates to a training device, and more particularly, to a training device to aid instrucion of students learning to become computer operators.

It is an object of the invention to simulate a computer terminal with a screeen and keyboard in an inexpensive and portable manner to eliminate the need to provide each student with his own expensive hardware during the initial period of instruction and to permit each student to study the procedure to be learned outside of the classroom.

SUMMARY OF THE INVENTION

The training device of the invention includes leaves hingedly connected together. The leaves may be paper or paperboard with indicia printed thereon and the hinges may be plastic or metal spirals, rings or other conventional book leaf connecting hinge means.

The leaves of the training device, when in use, are of three types. A plurality of first leaves having screen display simulation indicia on a first side thereof and keyboard action simulation indicia on a second side thereof. A second leaf, attached along its upper margin to the lower margin of the plurality of first leaves by a first common hinge means, has keyboard action simulation indicia on a first side thereof. A plurality of third leaves has operating instruction indicia on a first side thereof and keyboard action simulating indicia on a second side thereof. The plurality of third leaves are attached along their upper margins to the lower margin of the second leaf. Each of the keyboard action simulation indicia of the second leaf and the second sides of the plurality of first leaves and the plurality of third leaves corresponds to one of the screen display simulation indicia on the first side of one of the plurality of first leaves.

The plurality of first leaves and plurality of third leaves may be hingedly rotated in register with the second leaf and each other to produce a folded and closed portable and convenient training device capable of easily being carried from the classroom by the students for outside study and use.

The details of the invention will become more apparent from the drawings and the detailed description of the preferred embodiment and its use to follow.

BRIEF DESCRIPTION OF THE DRAWINGS

FIG. 4 is a plan view of the simulated screen display, simulated keyboard action and operating instructions for the "Sequence 2" mode of the training device.

FIG. 6 is a plan view of the simulated screen display simulated keyboard action and operating instructions for an intermediate stage of completion of the "Sequence 3" mode of the training device.

FIG. 7 is a plan view of the simulated screen display, simulated keyboard action and operating instructions for the completion of the "Sequence 3" mode of the training device.

DETAILED DESCRIPTION OF THE ILLUSTRATED EMBODIMENT

Figure 1:
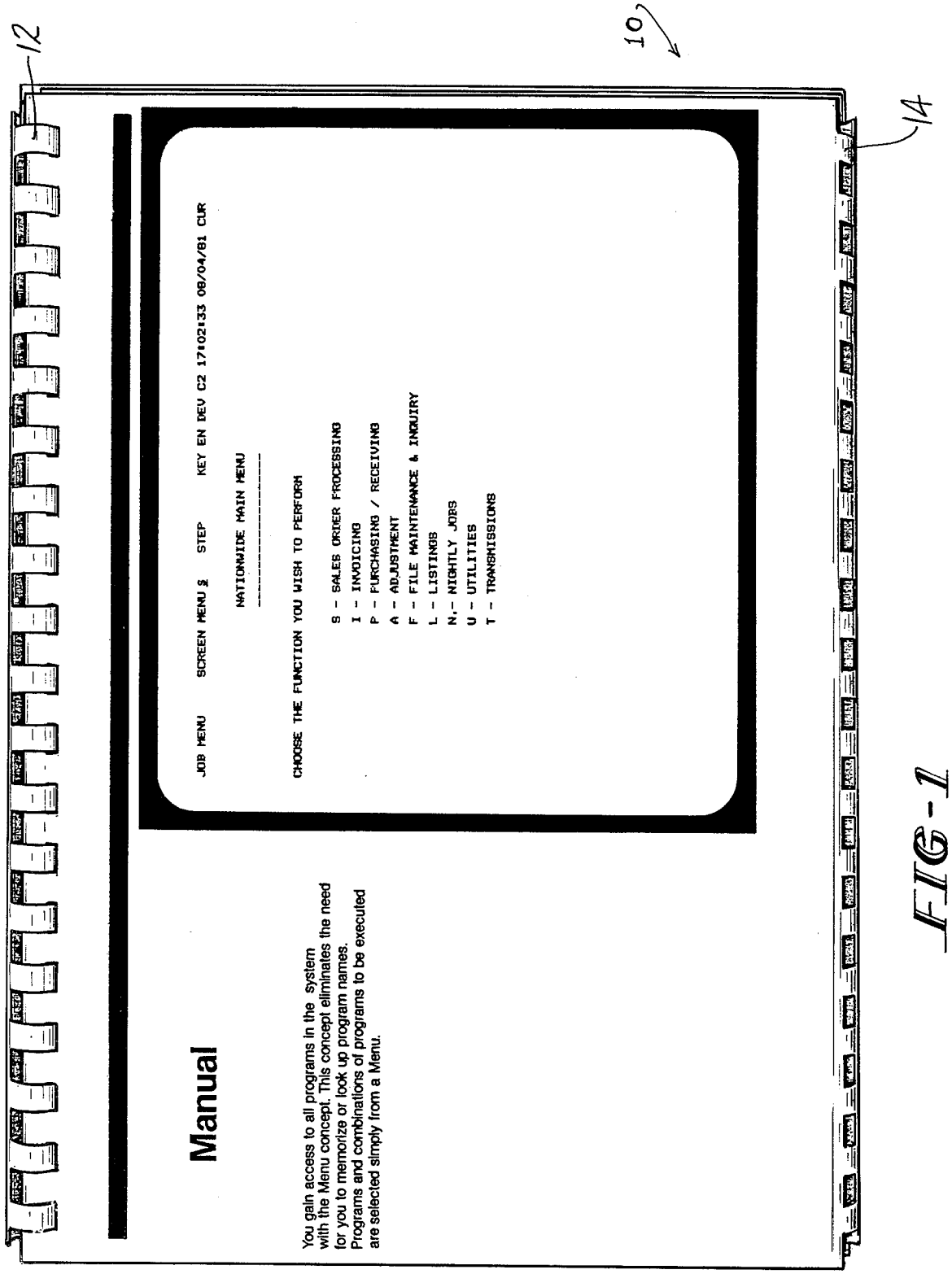
FIG. 1 is a perspective view of the training device of the invention in a folded and closed condition for carrying.

The numeral 10 generally designates a training device of the invention which is illustrated in a folded and closed condition in FIG. 1. The FIGS. 2-7 are in chronological order and illustrate the introduction and three simulated operating sequences.

The training device includes three types of leaves, 1L, 2L, and 3L and are so labelled in FIGS. 2-7. The leaves 1L, 2L, and 3L may be of paper, paperboard or plastic and the indicia is preferably printed thereon. For ease of printing, paper leaves are preferred.

A plurality of first leaves 1L as seen in FIGS. 2-7 each have screen display simulation indicia on a first side S1 and keyboard action simulation indicia on a second side S2. The leaves 1L are distinguished from each other in FIGS. 2-7 by their order of apperance during use and are sequentially numbered in the illustrated embodiment of FIGS. 2-7 1L1 through 1L5. Each of the five leaves have a first side S1 and a second side S2. Accordingly, the first leaf side can be identified 1L1S1 and the last of its type may be identified 1L5S2.

A second leaf is labelled 2L1, for like reasons, and is attached along its upper margin to the lower margin of the plurality of first leaves by a first common hinge 12. The second leaf, or more specifically, second leaf side 2L1S1 in FIG. 2 has keyboard simulation indicia on the upper or exposed side thereof.

Figure 5:
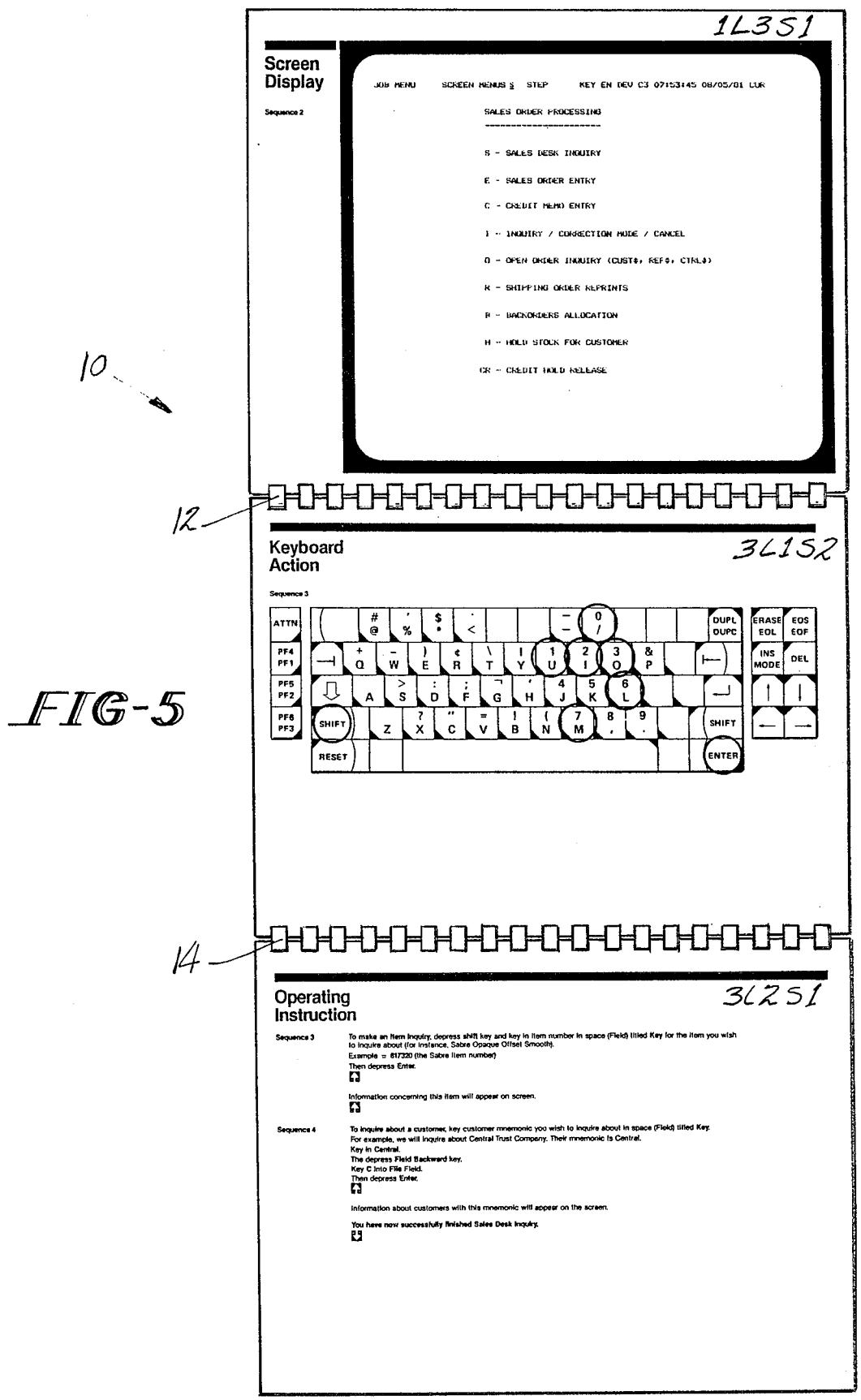
FIG. 5 is a plan view of the simulated screen display, simulated keyboard action and operating instructions for the start of the "Sequence 3" mode of the training device.
Figure 6:
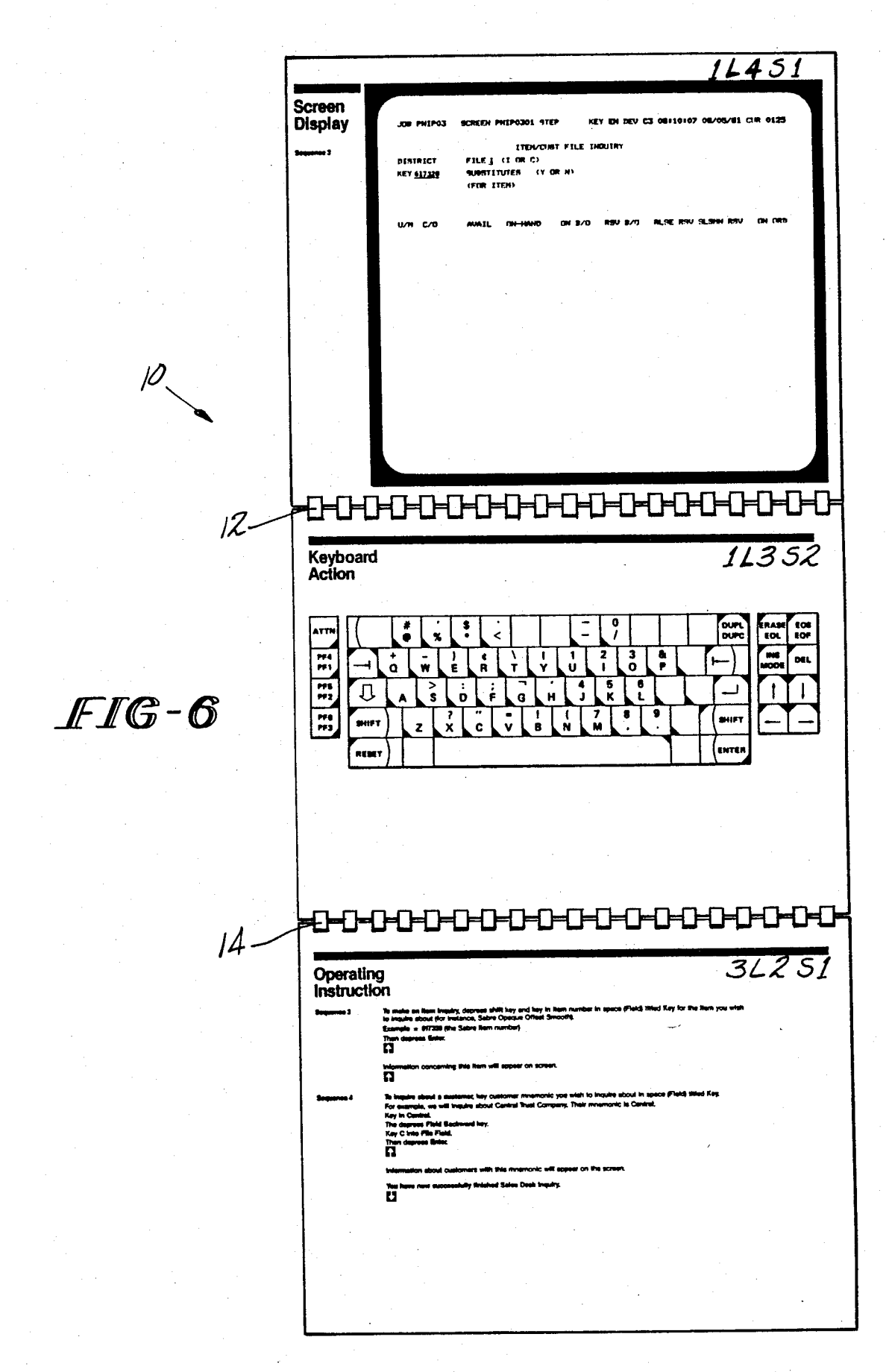
Figure 7:
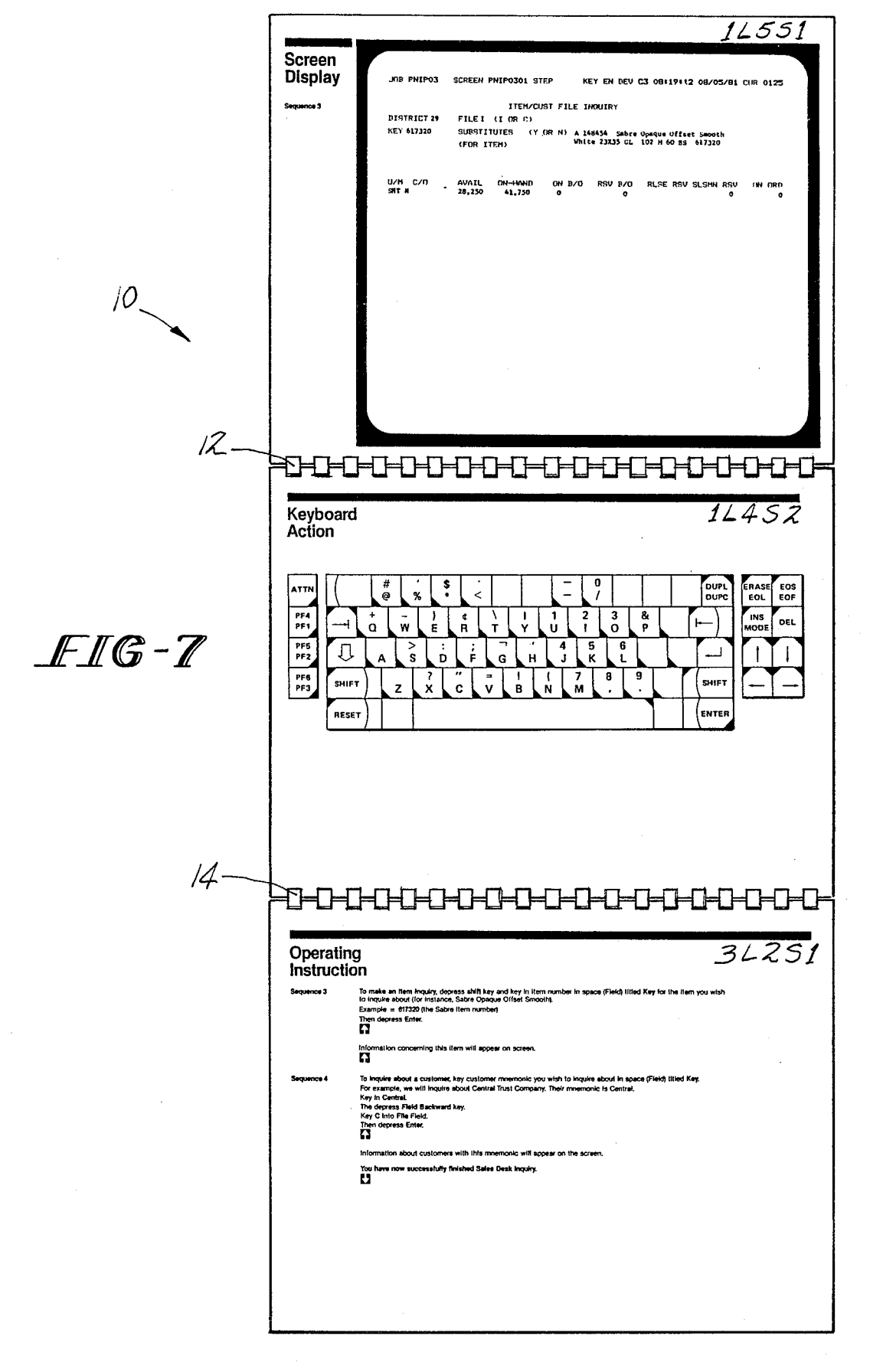

A plurality of third and for folding convenience somewhat narrower leaves 3L1 in FIGS. 2-5 through 3L2 in FIGS. 5-7 are attached along their upper margins to the lower margin of the second leaf 2L1. The keyboard action simulation indicia of the second leaf 2L1, the second sides 1L1S2 through 1L4S2 of the plurality of first leaves 1L1 through 1L4, and the second side 3L1S2 of the first leaf 3L1 of the plurality of third leaves corresponds to one of the screen display indicia on the first side S1 of one of the plurality of first leaves 1L1 through 1L5.

Hinges 12 and 14 between the types of leaves as shown in FIGS. 1-7 are preferably constructed of plastic and of a shape shown in the drawings. Metal or plastic rings or other conventional book leaf connecting hinge means also may be used.

The training device 10 is used as described below in connection with the drawings. Like notations indicate like leaf sides in the several views of FIGS. 1-7.

Figure 2:
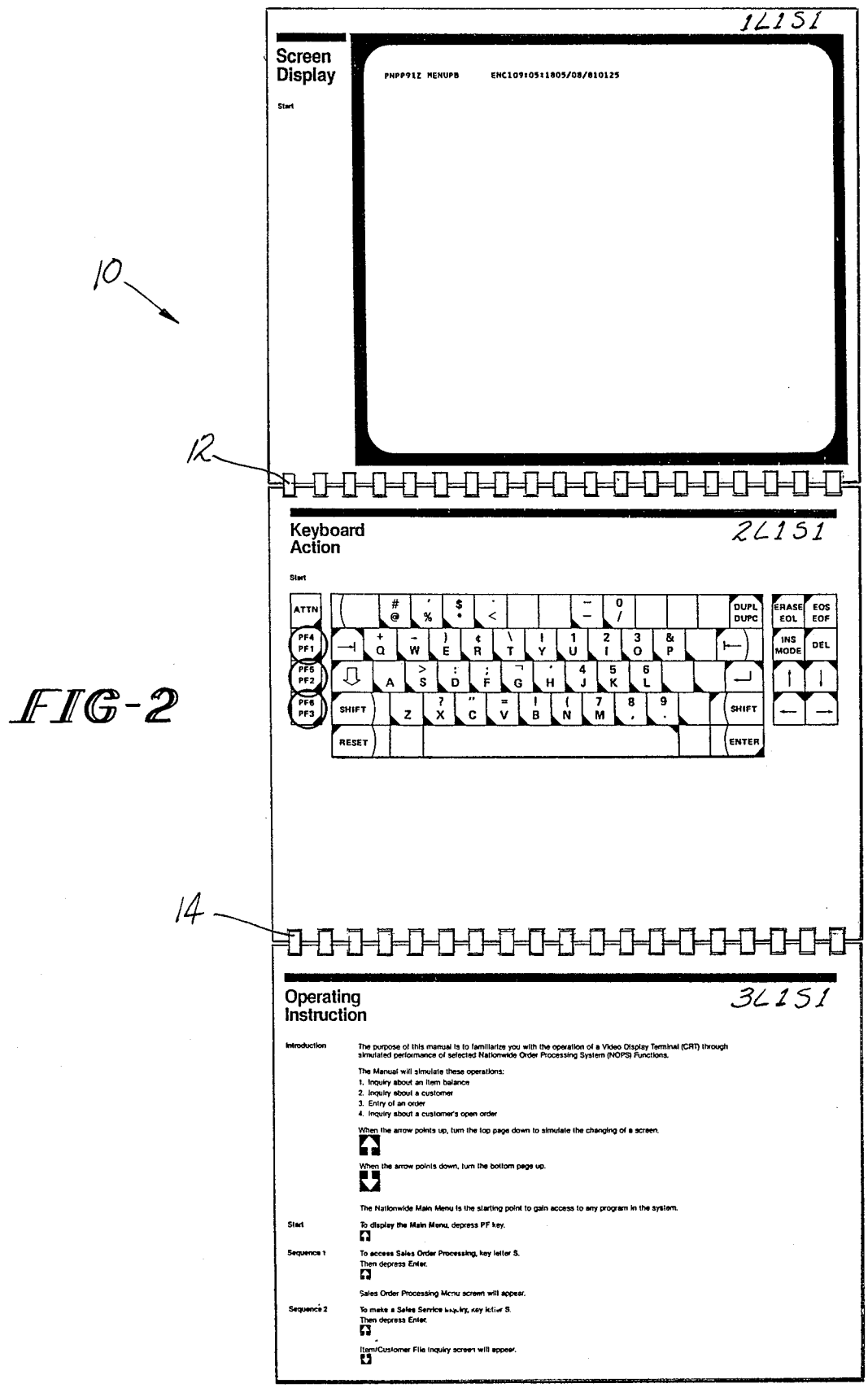
FIG. 2 is a plan view of the simulated screen display, simulated keyboard action and operating instructions for the introductory mode of the training device.

In FIG. 2, the introductory operating instructions on 3L1S1 is followed and screen simulation indicia 1L1S1 and keyboard action simulation indicia 2L1S1 are correspondingly visible. The circled keys are those depressed according to the 3L1S1 instruction. The screen display simulation 1L1S1 shows what would be on an actual screen if actual hardware were used with those keys depressed.

To indicate changed keyboard and screen conditions the leaves are flipped to positions shown in FIGS. 2-7 in accordance with arrow symbols in the instructions. After the introduction as shown in FIG. 2, the instructions order the commencement of "Sequence 1".

Figure 3:
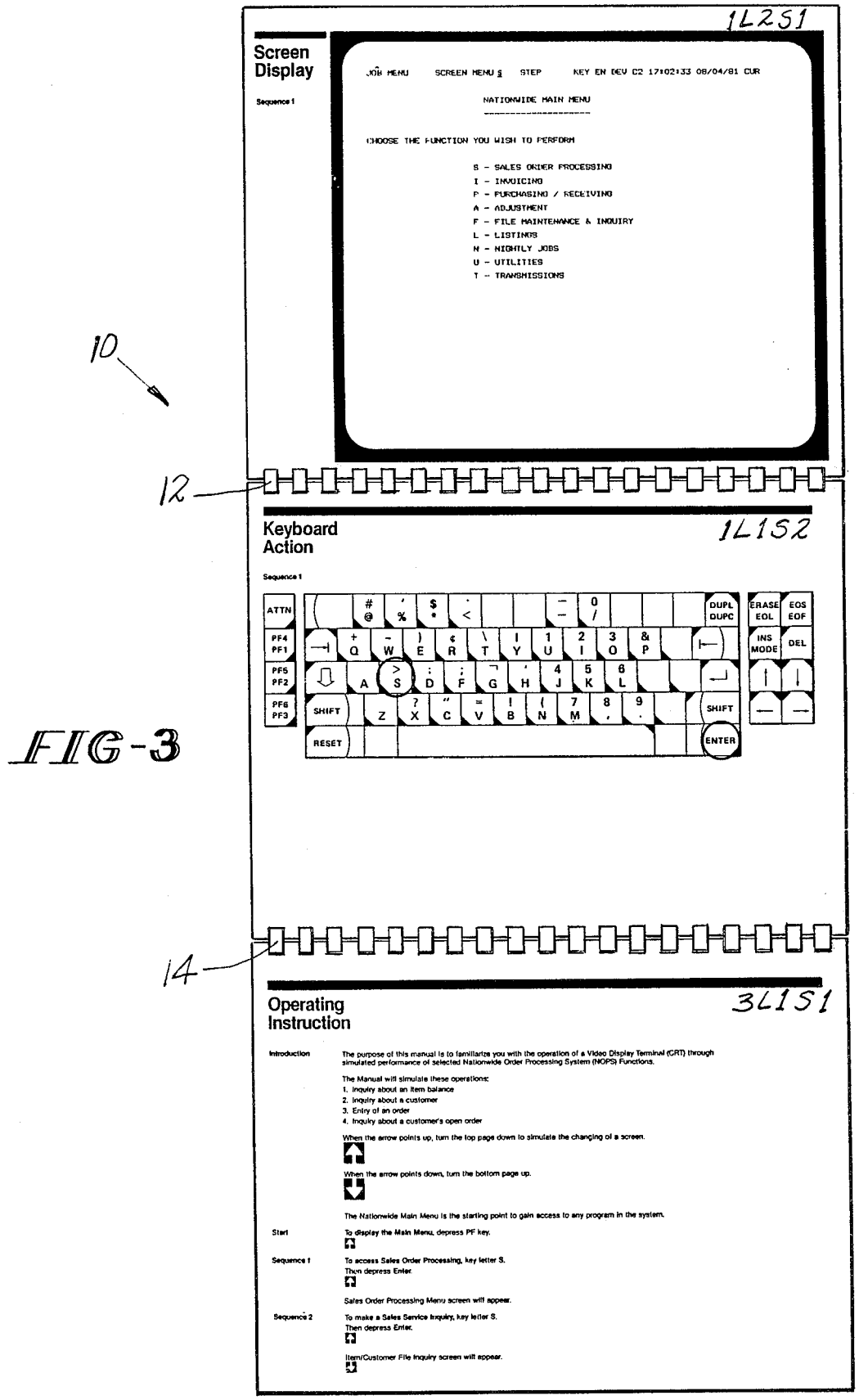
FIG. 3 is a plan view of the simulated screen display, simulated keyboard action and operating instructions for the "Sequence 1" mode of the training device.

"Sequence 1 in FIG. 3" teaches the operator to access sales order processing.

"Sequence 2 in FIGS. 4 and 5" teaches the operator to make a sales service inquiry.

"Sequence 3 in FIGS. 5-7" teaches the operator to make an item inquiry.

Other training sequences can be included, for example, to accomplish the following:

to inquire about a customer;
to enter a sales order into the system;
to release the order to the warehouse.

Thus, it will be seen that a novel, computer simulating training device which eliminates the need for expensive hardware and permits study out of the classroom is provided.

What is claimed is:

1. A training device which includes leaves hingedly connected together, comprising:
    a plurality of first leaves having screen display simulation indicia on a first side thereof,
    a second leaf attached along its upper margin to the lower margin of a first one of said first leaves by a first common hinge means,
    a plurality of third leaves having operating instruction indicia on a first side thereof,
    a first one of said third leaves attached along its upper margin to the lower margin of said second leaf,
    said first leaves and said third leaves having keyboard action simulating indicia on the second side thereof,
    each of said keyboard action simulating indicia corresponding to one of said screen display simulation indicia on a first side of one of said plurality of first leaves.

2. A printed computer training device having multiple sets of leaves hingedly connected together, a first one of said sets comprising:
    a first leaf having screen display simulating indicia on a first side thereof,
    a second leaf attached along its upper margin to the lower margin of said first leaf by a first common hinge means,
    said second leaf having keyboard action simulating indicia on a first side thereof,
    a third leaf attached along one of its margins to one of the margins of said first and second leaves opposite said first common hinge means by means of a second common hinge means,
    said third leaf having operating instruction indicia on a first side thereof.

3. A printed computer training device having multiple sets of leaves hingedly connected together, a first one of said sets comprising:
    a first leaf having screen display simulating indicia on a first side thereof,
    a second leaf attached along its upper margin to the lower margin of said first leaf by a first common hinge means,
    said second half leaf having keyboard action simulating indicia on a first side thereof,
    a third leaf attached along its upper margin to the lower margin of said second leaf opposite said first common hinge means by means of a second common hinge means,
    said third leaf having operating instruction indicia on a first side thereof.

4. The training device of claim 3 in which said third leaf is of lesser dimension between its upper and lower marginal areas than is said second leaf.

5. The training device of claim 3 in which said first leaf has keyboard action simulating indicia on the second side thereof.

6. The training device of claim 3 in which said third leaf has keyboard action simulating indicia on the second side thereof.

7. The training device of claim 3 in which said first leaf has keyboard action simulating indicia on the second side thereof and the third leaf has keyboard action simulating indicia on the second side thereof.

8. The training device of claim 7 in which each of said sets of leaves other than said first one of said sets has a screen display simulating indicia on a first leaf thereof corresponding to a keyboard action simulating indicia on either a second side of a different first leaf or a second side of a third leaf.

* * * * *

UNITED STATES PATENT AND TRADEMARK OFFICE
CERTIFICATE OF CORRECTION

PATENT NO. : 4,466,798
DATED : August 21, 1984
INVENTOR(S) : JAMES RICHARD CONROY It is certified that error appears in the above—identified patent and that said Letters Patent is hereby corrected as shown below:

Col. 2, line 24, delete "apperance" and insert therefor -- appearance -- ;

Col. 4, line 17, delete the word "half" .

Signed and Sealed this

Ninth Day of July 1985

[SEAL]

Attest:

DONALD J. QUIGG

Attesting Officer     Acting Commissioner of Patents and Trademarks